United States Patent [19]
Hall

[11] 4,102,499
[45] Jul. 25, 1978

[54] GAS TURBINE POWERPLANTS
[75] Inventor: John Matthew Hall, Backwell, Nr. Bristol, England
[73] Assignee: Rolls Royce (1971) Limited, Great Britain
[21] Appl. No.: 835,721
[22] Filed: Sep. 22, 1977

Related U.S. Application Data
[63] Continuation of Ser. No. 668,919, Mar. 22, 1976, abandoned, which is a continuation-in-part of Ser. No. 607,706, Aug. 25, 1975, abandoned.

[30] Foreign Application Priority Data
Sep. 7, 1974 [GB] United Kingdom ............... 39171/74

[51] Int. Cl.² ............................................. B64C 15/04
[52] U.S. Cl. ............................ 239/265.27; 239/265.29
[58] Field of Search ....................... 239/265.25, 265.27, 239/265.29, 265.31, 265.37; 244/12.2, 12.3, 12.5, 23 A, 23 B, 23 D, 52

[56] References Cited
U.S. PATENT DOCUMENTS

| 2,510,506 | 6/1950 | Lindhagen et al. ......... 239/265.27 X |
| 2,680,948 | 6/1954 | Greene ........................... 239/265.17 |
| 3,248,878 | 5/1966 | Clark et al. ................. 239/265.37 X |
| 3,486,698 | 12/1969 | Cologna ...................... 239/265.33 X |
| 3,558,058 | 1/1971 | Lennard et al. ................. 239/265.29 |
| 3,650,348 | 3/1972 | Colebrook et al. ......... 239/265.25 X |
| 3,739,582 | 6/1973 | Maison .,........................ 239/265.29 X |

FOREIGN PATENT DOCUMENTS

| 1,100,385 | 2/1961 | Fed. Rep. of Germany ... 239/265.17 |
| 895,331 | 5/1962 | United Kingdom ............ 239/265.17 |

Primary Examiner—John J. Love
Attorney, Agent, or Firm—Stevens, Davis, Miller & Mosher

[57] ABSTRACT

A gas turbine powerplant includes an attitude control nozzle comprising an aperture in a duct wall of the powerplant for discharging a propulsive stream from the powerplant. One or more flaps are each pivoted to the side edges of the aperture and pivotally movable into different positions relative to the duct. In one position the flaps co-operate to close the aperture and in further positions the free ends of the flap or flaps co-operate to define variously directed discharge orifices of variable area.

10 Claims, 7 Drawing Figures

U.S. Patent   July 25, 1978   Sheet 1 of 4   4,102,499
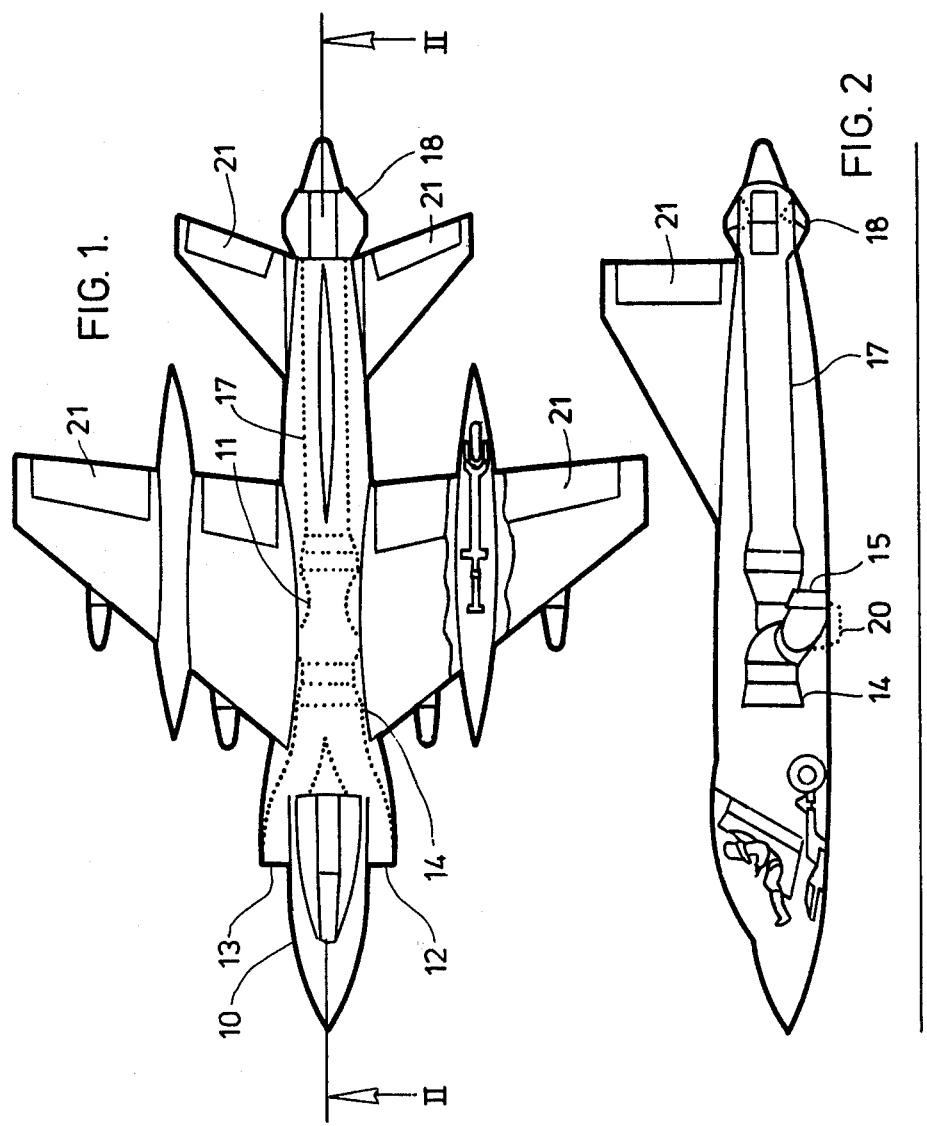

GAS TURBINE POWERPLANTS

This is a continuation of application Ser. No. 668,919 filed Mar. 22, 1976 now abandoned which in turn is a continuation-in-part of Ser. No. 607,706 filed Aug. 25, 1975 now abandoned.

This invention relates to improvements in gas turbine powerplants and has particular reference to a nozzle capable of varying the direction of discharge of a propulsive jet from a gas turbine engine.

Such nozzles are well-known in the art but are generally of relatively complex aerodynamic shape involving costly manufacture.

Furthermore if it is desired to vary the flow area of known nozzles further complications arise and there are situations in which the complications do not justify the effort.

The present invention seeks to provide a nozzle construction capable of varying the direction of discharge of a propulsive jet, the construction being of relatively straightforward design, and relatively economical to manufacture.

According to the present invention there is provided a gas turbine powerplant having a nozzle capable of varying the direction of discharge of at least a part of a propulsive jet therefrom, the nozzle comprising a wall defining a duct for the propulsive jet, an aperture in the wall and flap means pivotally connected to side edge means of the aperture for pivotal movement relative to the wall, said flap means being pivotable to define a plurality of discharge orifices each of a different orientation with respect to the duct, said orifices including an orifice arranged to discharge gases in an upstream direction and a further orifice arranged to discharge gases in a downstream direction.

The nozzle is particularly suited for use as an attitude control nozzle for an aircraft capable of short or vertical take-off.

Embodiments of the invention will now be described, by way of example only, and with reference to the accompanying drawings in which:

FIG. 1 is a plan view of an aircraft,

FIG. 2 is a side elevation of the aircraft of FIG. 1,

Figure 3:
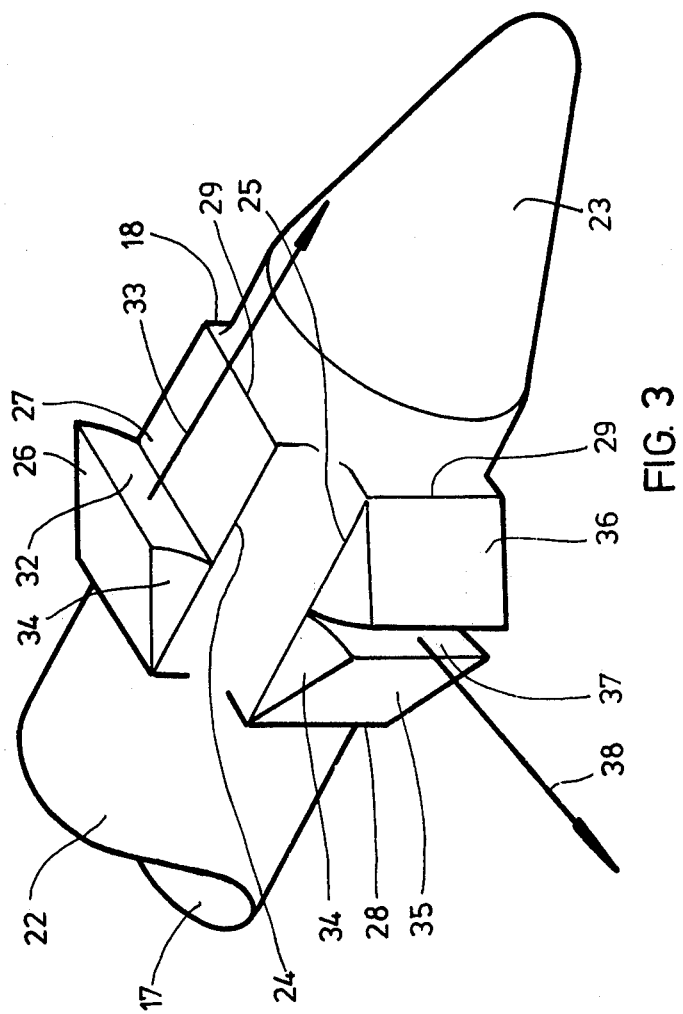
Figure 4:
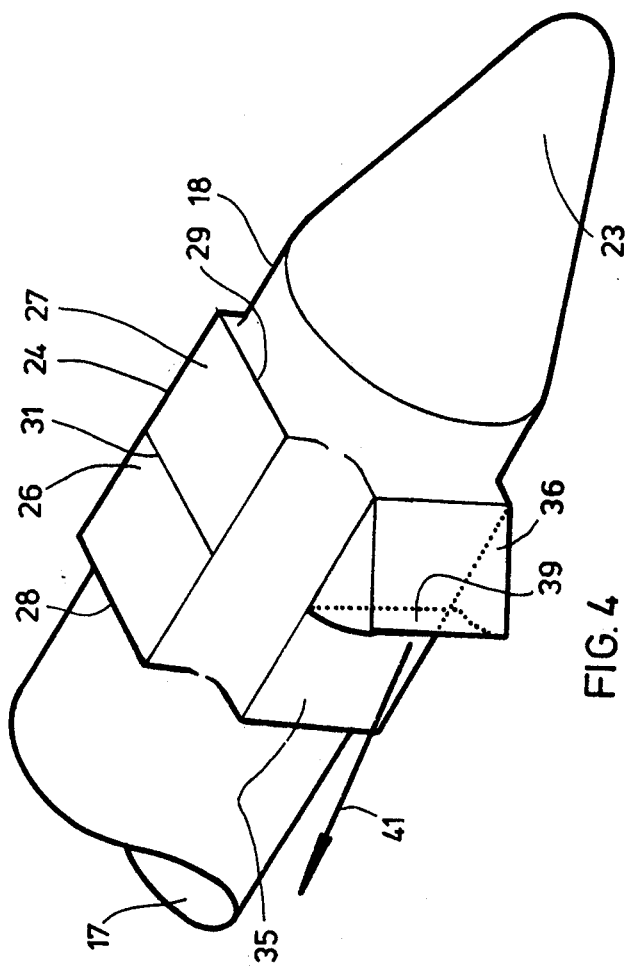
Figure 5:
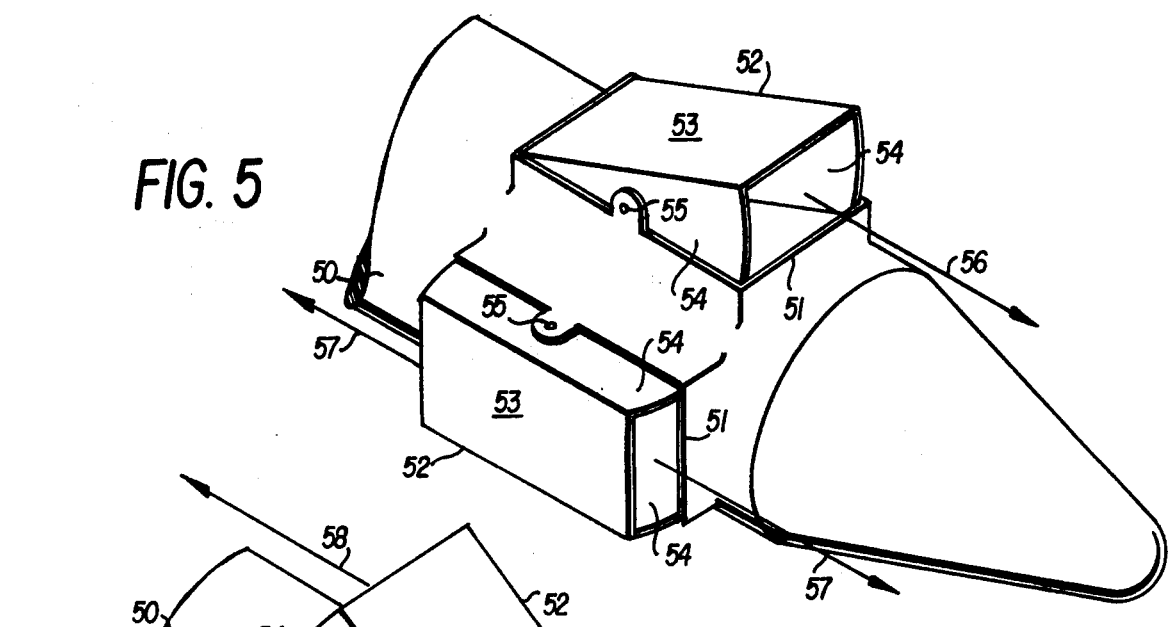
Figure 6:
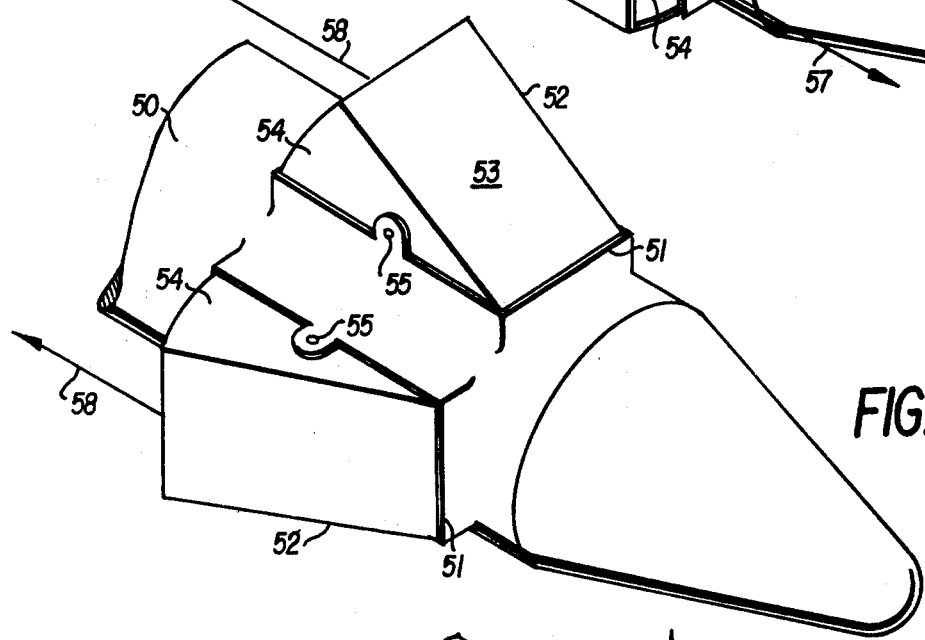
Figure 7:
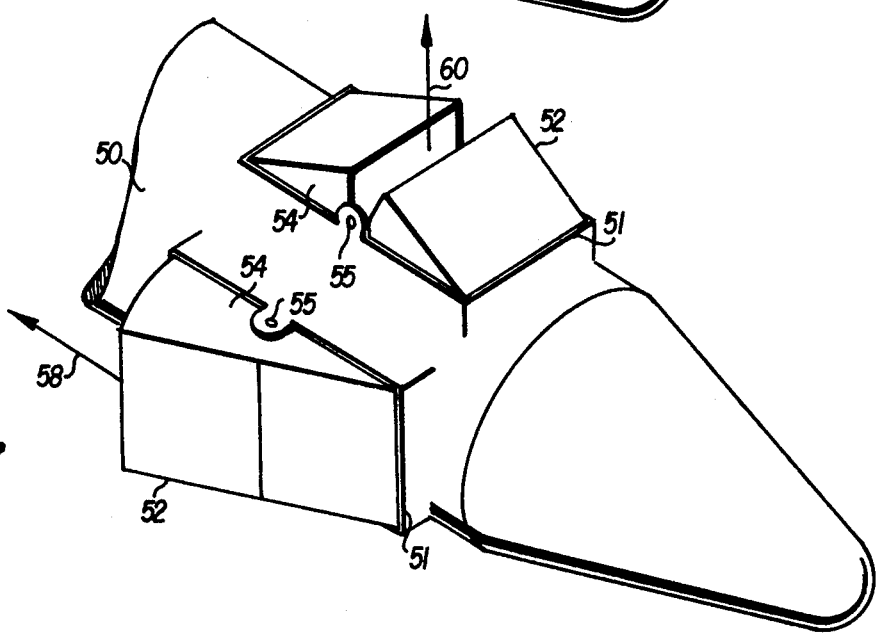

FIG. 3 is a perspective view of a nozzle for the gas turbine powerplant fitted to the aircraft of FIG. 1, FIG. 4 is a second perspective view of the nozzle shown in FIG. 3, FIGS. 5 and 6 are views similar to those of FIGS. 3 and 4 showing another embodiment, and FIG. 7 is a view similar to FIGS. 5 and 6 showing a modification of the arrangement illustrated in FIGS. 5 and 6.

Referring now to FIGS. 1 and 2 an aircraft 10 capable of short or vertical take-off is provided with a gas turbine powerplant 11. The gas turbine powerplant 11 receives air from two forward facing intakes 12 and 13. The air is compressed by a fan 14 and divided into two parts by a flow splitter (not shown). The first part is discharged through a pair of swivellable nozzles 15, (only one shown), such as are well-known per se. The second part is passed to a core engine and substantially all the work produced by the core engine is used to drive the fan 14. The relatively low pressure exhaust from the core engine is passed by a duct 17 to a nozzle 18 at the rear of the aircraft.

The engine 10 thus produces two propulsive jets, one jet for discharge by the swivellable nozzles and the second jet, the core engine exhaust, for discharge by the nozzle 18.

For vertical take-offs the swivellable nozzles 15 are moved to the dotted line position 20 so that the discharge therefrom produces a net upward thrust on the aircraft. The nozzle 18 is used principally, as will be explained later, for controlling the aircraft in pitch and yaw during vertical take-off and at low forward speeds of the aircraft when the conventional aerodynamic control surfaces 21 are inoperative.

Turning now to FIGS. 3 & 4 the nozzle 18 is shown in more detail. The duct 17 is enclosed by a generally cylindrical wall 22 and is closed at its downstream end by a cone 23. In the wall 22 are apertures 24 and 25 facing vertically upwards and horizontally respectively. Two further identical apertures are correspondingly disposed on the other side of the nozzle.

A pair of flaps 26, 27 are pivotally connected to the wall 22 of the nozzle at opposite sides of the aperture 24 by their respective edges 28, 29. Each flap is movable by a respective jack (not shown but well known per se) and it will be seen from FIG. 4 that in a first position 31 both flaps lie flush with the wall 22 of the duct and co-operate to close the aperture 24 thus preventing flow therethrough. Alternatively as in FIG. 3 the flaps 26 and 27 co-operate to define a rearwardly directed orifice 32 from which the propulsive jet is discharged rearwardly in the direction of the arrow 33. The flaps each have side faces such as 34 which substantially prevent the leakage of pressurised fluid through the sides of the flaps.

The aperture 25 is provided with two flaps 35, 36 identical to the flaps 26 and 27 and in the FIG. 3 position the flaps have both been pivoted outwardly from the nozzle 18 to define a sideways facing orifice 37 from which the propulsive jet is discharged in the direction of the arrow 38.

In FIG. 4 the flap 35 can be seen closed flush to the wall 22 of the duct so that it co-operates with the flap 36 to define a forwardly facing orifice 39 from which the propulsive jet discharges in the direction of the arrow 41.

It will be understood that each pair of flaps can be moved to further positions in which they co-operate to define a plurality of corresponding orifices each with a different orientation with respect to the duct 17 for varying the direction of discharge of the propulsive jet. Furthermore, by controlling the angular extent of the pivotal movement of the flaps, the area of the discharge orifice as well as its direction of discharge is variable. The area of the discharge orifice defined by any one pair of flaps is variable either independently of, or simultaneously to, its orientation.

FIGS. 5, 6 and 7 show two further embodiments in which the disposition of flaps is different from that shown in FIGS. 3 and 4 whilst the basic principle remains unaltered. In the embodiment of FIGS. 5 and 6 the jet pipe 50 has four apertures 51 disposed in similar fashion to the apertures shown in the FIGS. 3 and 4 embodiment. There is one aperture on top, one underneath and one on each side. Each aperture 51 has a single flap 52 comprising a substantially flat base 53 and two sides 54 extending perpendicularly of base 53, which give the flap a substantially U-shaped cross-section when viewed in the longitudinal direction of the jet pipe. Each side 54 is pivoted at a hinge 55 half way along its longitudinal length and this enables the flap 52 to be moved between the three positions shown in the drawings. These are, firstly, with the upstream edge of the flap closing the aperture side edge and leaving an opening facing downstream so as to project gases as shown by arrow 56 in FIG. 5. Secondly, the flap can be pivoted to lie parallel to the aperture so as to discharge equally fore and aft as shown by arrows 57 in FIG. 5. Thirdly, the downstream edge of the flap can be pivoted to close the edge of the aperture so as to direct the gases in the upstream direction as shown by arrows 58 in FIG. 6.

Referring lastly to FIG. 7 the flaps of FIGS. 5 and 6 are modified by being split in the middle so as to be capable of being hinged in two portions, one upstream and the other downstream of hinge 55. This arrangement gives the facility to produce the three gas directing positions illustrated in FIGS. 5 and 6 and the position illustrated in FIG. 6 in which the gases are directed upstream as shown by arrow 58, is also illustrated in FIG. 7. However, a further position can be achieved in which the two halves of the flap 52 are pivoted to close the upstream and downstream side edges of the aperture and the gases are ejected perpendicularly of the jet pipe in the direction of arrow 60. This position is similar to the arrangement shown in FIG. 3.

In the arrangements shown in FIGS. 5, 6 and 7 the connection between the flaps 52 and hinges 55 include jacks (not shown but well known in the art) by means of which the flaps can be retracted to close the respective aperture.

The apertures in the top and bottom of the duct wall are useful to control pitching moments of the aircraft. Thus with the aperture at the top of the duct closed and the flaps of the diametrically opposite aperture at the bottom of the duct wall defining a downwardly directed orifice a tail up pitching moment of the aircraft will be produced.

In similar fashion the side aperture shown and the corresponding aperture at the other side of the duct are used for yaw control of the aircraft.

For braking of the aircraft each flap or pair of flaps co-operates to define forwardly directed orifices such as 39, and for forward propulsion the flaps co-operate to define rearwardly directed orifices such as 32.

The shape of the cone 23 is chosen to follow the well-known boat tail angle for the avoidance of base drag.

Whilst the present embodiments are applied to vertical or short take off aircraft, and particularly to the pitch and yaw control thereof at low forward speeds, there is no reason why they should not be used for the pitch and yaw control of conventional aircraft, or to assist, or replace, aerodynamic control surfaces for the pitch and yaw control of any aircraft at higher forward speeds.

In particular there is no reason why the end of the duct 17 need be completely closed as by the cone 23. In one embodiment (not shown) the cone 23 is replaced by a conventional final nozzle for a gas turbine engine.

In this embodiment it may prove necessary to utilise for example blocker doors or deflector plates in order to ensure sufficient flow through the nozzle 18.

In the embodiments in which the duct 17 is closed by the cone 23, it will be appreciated that a control system may be needed to ensure that at all times there is a sufficient total nozzle exit area through the orifices defined by each flap or pair of flaps to avoid undesirable back pressures in the duct 17. In order to maintain this total nozzle exit area and, at the same time, allow the pitch and yaw of the aircraft to be controlled, a system of a kind that would be well understood by those skilled in the art, may need to be provided for synchronising the various jacks that effect pivotal movement of the respective flaps.

In certain embodiments it suffices to control only either pitch or yaw and in such an arrangement only one pair of opposed pivotal flaps are required.

I claim:

1. A gas turbine powerplant having a nozzle capable of varying the direction of discharge of at least a part of a propulsive jet therefrom, the nozzle comprising a wall defining a duct for the propulsive jet, an aperture in the wall, means closing the duct aft of the aperture and a substantially U-shaped flap member pivotally connected about its middle to side edge means of the aperture for pivotal movement relative to the wall, said flap member being pivotable between two extreme positions to define two discharge orifices differently orientated with respect to the duct, one said extreme position corresponding to an orifice arranged to discharge gases in an upstream direction, the other said extreme position corresponding to an orifice arranged to discharge gases in a downstream direction, and there being an intermediate position in which there are defined two discharge orifices capable of discharging equally in upstream and downstream directions.

2. A gas turbine powerplant according to claim 1, there being further provided sealing means between the said member flap and the sides of the aperture, said sealing means comprising inwardly directed side walls of the flap.

3. A gas turbine powerplant according to claim 1, and having two said substantially U-shaped flap members disposed one above and one below the duct and means for varying the relative positions of the flap members to produce a pitching moment.

4. A gas turbine powerplant according to claim 1, and having two said substantially U-shaped flap members disposed one to either side of the duct and means for varying the relative positions of the flap members to produce a yawing moment.

5. A gas turbine powerplant having a nozzle capable of varying the direction of discharge of at least a part of a propulsive jet therefrom, the nozzle comprising a wall defining a duct for the propulsive jet, an aperture in the wall, and a pair of generally channel shaped flaps, the flaps each having a respective pivotal connection along opposite side edge means of the aperture about axes disposed transversely of the flaps and at respective opposite ends thereof and means for relatively pivotally moving the flaps about their respective axes to a plurality of different relative positions wherein confronting edges of the flaps cooperate to define a plurality of corresponding differently directed discharge orifices and in which side edge members of the channel section flaps sealingly cooperate with corresponding side edges of the aperture.

6. A gas turbine powerplant according to claim 5 and in which there is provided four pairs of flaps disposed one to either side, one above and one beneath the duct.

7. A gas turbine powerplant according to claim 6 in which there is provided means for varying the relative size of the discharge orifices defined by the pairs of flaps above and below the duct to produce a pitching moment.

8. A gas turbine powerplant according to claim 6 and in which there is provided means for varying the relative size of the discharge orifices defined by the pairs of flaps disposed one to either side of the duct to produce a yawing moment.

9. A gas turbine powerplant according to claim 5 and in which the duct is closed downstream of the or each pair of flaps by a conical plug converging at the so-called boat tail angle.

10. A gas turbine powerplant having a nozzle capable of varying the direction of discharge of at least a part of a propulsive jet therefrom, the nozzle comprising a wall defining a duct for the propulsive jet, an aperture in the wall, and a pair of generally channel shaped flaps, the flaps each having a respective pivotal connection across the aperture to side edge means of the aperture about axes disposed transversely of the flaps and at respective adjacent ends of the flaps, and means for relatively pivotally moving the flaps about their respective axes to two positions, a first position in which said adjacent ends of the flaps abut each other and the other end of one of said flaps cooperates with one side edge of the aperture to define an axially directed discharge orifice and a second position in which said adjacent ends of the flaps cooperate to define a radially directed discharge orifice and in which, in all positions, side edge members of the channel section flaps sealingly cooperate with corresponding side edges of the aperture.

* * * * *